Patented May 25, 1943

2,320,223

UNITED STATES PATENT OFFICE 2,320,223

USE OF BAUXITE TO IMPROVE THE ODOR OF PETROLATUM

Henry J. Dempsey, Elizabeth, N. J., assignor to Standard Oil Development Company, a corporation of Delaware No Drawing. Application December 28, 1940, Serial No. 372,169

3 Claims. (Cl. 196—21)

This invention relates to improvements in the refining of petrolatum and relates particularly to the removal of substances that impart an undesirable odor to petrolatum.

In the refining of petrolatum the substances that impart undesirable odors to petrolatum have been removed heretofore first by treating with sulfuric acid, followed by a treatment with caustic soda, after which the petrolatum is washed with water and finally filtered or percolated through or treated with an absorbent such as fuller's earth. Other absorbent solids have been used to treat petrolatum, such as bauxite, charcoal, etc. It has been found that the odor of the petrolatum is greatly improved when treated with any of these solid absorbents, but the yields were found to be materially small and in a very short while the product obtained is greatly inferior to that first treated with the solid absorbent. It is believed that the low yields of deodorized petrolatum are due partially to the fact that once the absorbent bed is filled to capacity, any more petrolatum that is added only tends to dilute the petrolatum in contact with the solid absorbent and therefore, under continuous operation, the time of contact is not sufficient to obtain the desired odor improving effect as the diluted material woud require such a long time of contact to improve the odor to the desired degree that it is not commercially practical to do so. When one ton of 30 to 60 mesh bauxite is used as an absorbent on adding petrolatum heated to a temperature above its melting point, 2 barrels of the petrolatum are absorbed or soaked up by the bauxite and 1.2 barrels of the petrolatum are drainable. Any further amounts of petrolatum tend to dilute the drainable petrolatum and the full effect of deodorizing capacity of the absorbent is not obtainable.

It is an object of this invention to improve the odor of petrolatum by treating with a solid absorbent.

Another object of this invention is to improve the yields of deodorized petrolatum upon treating with solid absorbents.

According to this invention the odor of petrolatum is improved by filtering the petrolatum at a temperature above the melting point of the petrolatum through bauxite intermittently. A marked improvement of the odor is obtained over the odor of the same product filtered through fuller's earth, either continuously or intermittently, or petrolatum filtered through bauxite continuously. For example, petrolatum from 550° F. flash Pennsylvania cylinder oil was filtered in a filter using two kinds of bauxite A and B. Bauxite A consists of raw bauxite burned at 900° F. to a volatile content of approximately 2%. Bauxite B consists of the same raw bauxite burned at a temperature of about 1200° F. This burning process is sometimes referred to as activation of the bauxite. The continuous filtration of the petrolatum through bauxite is carried out by passing it through the absorbent at a rate of approximately 1 cc. per minute for each 38 grams of the bauxite, the time of contact of the petrolatum and bauxite being at least about 10 minutes. The intermittent operation consisted of adding petrolatum to bauxite at the same rate of 1 cc. per minute for each 38 grams of the bauxite but in the intermittent operation the petrolatum was added to the absorbent at the above rate until the petrolatum appeared at the bottom of the filter, after which no more petrolatum was added, and the drainable petrolatum was drained from the filter, after which draining was completed, another charge of the stock was fed to the filter and the process repeated until the desired color and odor was obtained on the filtrate. It should be noted that the increased time of contact produces odor improvement when petrolatum is filtered through bauxite A and bauxite B but this does not hold with respect to an absorbent such as fuller's earth where the longer the time of contact the poorer the odor of the filtered product and the petrolatum filtered through bauxite B produces a product having a better odor than petrolatum filtered through bauxite A or fuller's earth. Where similar volumes of bauxite and fuller's earth are used, the weight of the bauxite having a mesh 30 to 60 was 1.7 tons. In this case 2.2 barrels of petrolatum were drainable and 3.5 barrels of petrolatum were soaked in the absorbent. The same volume of fuller's earth weighed only 1 ton and 2.5 barrels of drainable and 4.2 barrels of soaked in petrolatum were used.

Comparative results of filtration are shown in the attached table where bauxite and fuller's earth are used both continuously and intermittently.

*Filtration of undiluted petrolatum from 550 flash Pennsylvania cylinder stock*

|  | Continuous operation | | | Intermittent operation | | |
|---|---|---|---|---|---|---|
|  | Fuller's earth | Bauxite A | Bauxite B | Fuller's earth | Bauxite A | Bauxite B |
| Grams absorbent used | 227 | 380 | 380 | 227 | 380 | 380 |
| Filter yield_____cc__ | 1,600 | 1,300 | 1,100 | 1,600 | 1,200 | 1,100 |
| Filtrate color, tag. Robinson_____ | 2 | 2 | 2 | 2 | 2 | 2 |
| Approx. time of contact_____minutes__ | 10 | 10 | 10 | 40 | 40 | 40 |
| CC. drained after soaking_____ |  |  |  | 120 | 100 | 100 |
| Filtering temp___°F__ | 190 | 190 | 190 | 190 | 190 | 190 |
| Melting point of filtered stock_____ | 133 | 133 | 133 | 133 | 133 | 133 |
| Odor_____ | (1) | (2) | (2) | (1) | (3) | (3) |

[1] Poor.  [2] Improved.  [3] Much improved.
NOTE.—The petrolatum filtered tested ½ R. Color and 133° F. melting point before filtering.
Bauxite A—Activated at 900° F.
Bauxite B—Activated at 1200° F.

I claim:

1. A process of deodorizing petrolatum which comprises reducing the bauxite to a powder of 30 to 60 mesh and heating to a temperature from 900° F. to 1200° F., placing the powdered bauxite into a filter and adding petrolatum heated to a temperature above the melting point at the rate of 1 cc. per minute for about each 38 grams of the bauxite, until the petrolatum appears at the bottom of the filter, the time of contact of the petrolatum and bauxite being at least 10 minutes, allowing the petrolatum to drain from the filter without the addition of any more of the petrolatum, when no more petrolatum is drainable from the bauxite another quantity of petrolatum is added at the same rate until the petrolatum again appears to drain from the bottom of the filter, discontinuing the addition of further petrolatum and removing the drainable petrolatum, continuing these intermittent steps until the bauxite is exhausted.

2. A process of deodorizing petrolatum which comprises adding a petrolatum heated above its melting point to bauxite which had been activated by heating to a temperature ranging from 900° F. to 1200° F. and ground to a 30 to 60 mesh fineness, in excess to that absorbed by the said bauxite, but not in excess to that absorbed and contained in the voids of said bauxite mass, allowing the petrolatum to drain from the said bauxite until no more petrolatum is drainable from the bauxite, adding a fresh quantity of petrolatum in excess and repeating the same steps until the bauxite is spent.

3. A process of deodorizing petrolatum which comprises the following steps, placing powdered activated bauxite into a filter, adding to the filter a petrolatum heated above its melting point until petrolatum appears in the bottom of the filter, allowing the petrolatum to drain from the filter without the addition of any more petrolatum, when no more petrolatum is drainable from the filter another quantity of petrolatum heated above its melting point is added and continuing these intermittent steps until the bauxite is exhausted.

HENRY J. DEMPSEY.